Aug. 28, 1973
T. L. BLANEY
3,755,389
METHOD OF SEPARATING FATTY ACIDS
Filed Jan. 24, 1970
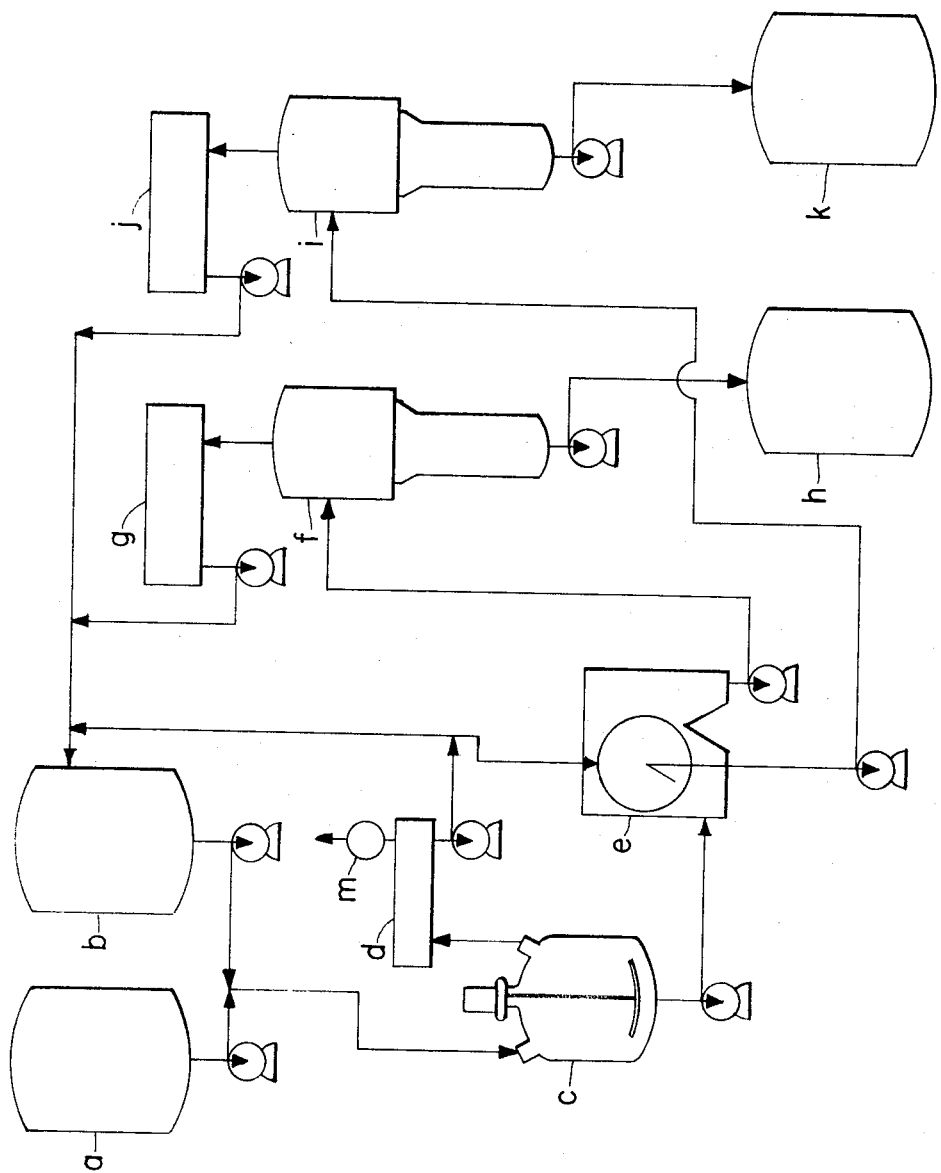
INVENTOR.
Ted L. Blaney
BY Ronald L. Hemingway
ATTORNEY

United States Patent Office 3,755,389
Patented Aug. 28, 1973

3,755,389
METHOD OF SEPARATING FATTY ACIDS
Ted L. Blaney, Forest Park, Ohio, assignor to The Procter & Gamble Company, Cincinnati, Ohio
Filed Dec. 24, 1970, Ser. No. 101,230
Int. Cl. C11c 1/08
U.S. Cl. 260—419          6 Claims

ABSTRACT OF THE DISCLOSURE

A process for separating saturated fatty acids (predominantly palmitic and stearic) from unsaturated fatty acids (predominantly oleic) comprising the steps of dissolving the fatty acids in methyl formate, cooling the solution to 30° F., and separating the crystallized fatty acids from the solution.

BACKGROUND OF THE INVENTION

This invention relates to a method of separating saturated fatty acids from unsaturated fatty acids, the saturated fatty acids being predominantly palmitic and stearic acids and the unsaturated fatty acids being predominantly oleic acid, and further relates to a method of separating the saturated fatty acids from each other.

The oleic and stearic acids of commerce are produced primarily from such materials as tallow, garbage grease and the like by hydrolyzing the fats and then separating the mixture of fatty acids thus obtained into the saturated and unsaturated components. The unsaturated component is the oleic acid of commerce and consists predominantly of oleic acid, and the saturated component is the stearic acid of commerce which consists predominantly of a mixture of palmitic and stearic acids in a weight ratio of approximately 50–55% palmitic and 45–50% stearic acid. The original fatty acid mixture obtained from hydrolysis of the fat typically contains about 47%, saturated fatty acids (predominantly palmitic and stearic) and about 53% unsaturated fatty acids (predominantly oleic).

Since oleic acid on the one hand, and stearic and palmitic acids on the other, are employed in widely different commercial uses as a result of their differing chemical and physical properties, the need for separating them has long been recognized.

Two general methods of obtaining this separation have gained wide commercial use. One is the pressing method wherein the mixtures of fatty acids obtained from tallow, lard, etc. are chilled to about 40° F. to form a cake which is then wrapped in fabric and mechanically pressed. Some of the unsaturated acids are removed in this way but large quantities are retained in the cake. The pressing operation is then repeated at a higher temperature and then optionally again at a still higher temperature. In each case the cake is called, respectively, single, double or triple pressed stearic acid, while the liquid, which is primarily oleic acid, is the oleic acid of commerce which also is commonly called red oil. Typically, commercial double pressed stearic acid contains about 94% saturated fatty acids (primarily palmitic and stearic) and 6% unsaturated fatty acids (primarily oleic) and red oil contains about 90% unsaturated fatty acids (primarily oleic) and about 10% saturated acids (primarily palmitic and stearic). The main disadvantages of the pressing method are that it is slow and requires considerable labor. Also, the range of fatty acid mixtures which can be effectively separated by this process is rather limited and the method is not capable of separating palmitic and stearic acids from each other.

A second method which has gained wide commercial use is solvent crystallization (see U.S. Pat. 2,293,676, issued to Meyers et al., Aug. 18, 1942). In this process approximately 25–30% of the mixture of saturated and unsaturated acids is dissolved in a polar organic solvent (methanol and acetone being the ones in widest commercial use for this purpose), and then the solution is cooled (to about 14° F. with methanol or about 0° F. with acetone). The saturated fatty acids which crystallize from the solution are filtered and washed and the unsaturated fatty acids which remain in the solvent, are recovered by evaporating the solvent. The degree of separation obtained with tallow fatty acid feedstock by this process is approximately the same as obtained with double pressing in the pressing process. In a refinement of the solvent crystallization process the solution of fatty acids is cooled in a stepwise manner, wherein predominantly stearic acid crystals are recovered in the earlier steps and predominantly palmitic acid crystals are recovered in the later steps. The main disadvantage of the solvent crystallization method, using methanol or acetone as the solvent, is the cost of refrigeration needed in order to obtain the required low temperatures.

It is the main object of the present invention to provide an improved solvent crystallization method for separating oleic from palmitic and stearic acids and further, to separate palmitic and stearic acids from each other.

SUMMARY OF THE INVENTION

The invention herein relates to an improved solvent crystallization process wherein a high degree of separation of oleic from palmitic and stearic acids is obtained at crystallization temperatures substantially higher than previously deemed possible, the primary advantage of said process being its relatively low refrigeration requirements compared to the crystallization processes currently in commercial use. The process comprises the steps of: (1) dissolving up to about 40% by weight of a fatty acid mixture comprising from about 20% to about 90% by weight oleic acid, from about 3% to about 55% stearic acid and from about 3% to about 55% palmitic acid in methyl formate solvent, the resulting solution containing no more than about 20% by weight of water; (2) cooling said solution to about 30° F., thereby causing crystallization of stearic and palmitic acids from the solution; and (3) separating the crystallized fatty acids from the solution.

In one embodiment of the invention the cooling can be conducted in a stepwise fashion such that stearic acid will crystallize out predominantly in the earlier steps thereby providing a separation of stearic and palmitic acids from each other as well as a separation of stearic and palmitic acids from oleic acid.

BRIEF DESCRIPTION OF THE DRAWING

The drawing is a flow chart of a process of the invention.

DETAILED DESCRIPTION

The invention herein comprises a process for separating saturated fatty acids from unsaturated fatty acids, the saturated fatty acids being predominantly palmitic and stearic acids and the unsaturated fatty acids being predominantly oleic. The term separation as used herein is not limited to mean complete separation of one type of acid from the other but also encompasses separation wherein mixtures are obtained which are richer, respectively, in saturated fatty acids or unsaturated fatty acids than the original mixture; or richer, respectively, in stearic or palmitic acid than the blend of these two acids in the original fatty acid mixture. The fatty acid mixtures suitable for treatment by the process herein comprise from about 20% to about 90% by weight oleic acid, from about 3% to about 55% by weight stearic acid and from about 3% to about 55% by weight palmitic acid and can be obtained from animal sources such as lard, beef tallow, and mutton tallow, vegetable sources such as cocoa butter and peanut oil or synthetic sources such as the oxidation of olefins to fatty acids.

The methyl formate solvent used in the invention herein is a well known item of commerce, most commonly being produced by heating methyl alcohol with sodium formate and hydrochloric acid.

The level of fatty acids dissolved in the solvent can be up to about 40% by weight of the total solution, and preferably between about 10% and 30% by weight, most preferably between about 20% and 25% by weight. Levels above about 40% by weight give poor selectivity in crystallization, and it is difficult to handle the crystal slurry because the crystals tend to take on a mushy consistency. It is relatively uneconomical to employ fatty acid levels below about 10% by weight.

Water can be present in the solution of fatty acids at levels of from 5% to about 20% of the total weight of the solution. Although no water need be present, it is preferred that from about 5% to about 10% of water be present in the solution. This amount of water unexpectedly improves the selectivity of the crystallization process. Water levels in excess of 20% should be avoided since they will result in low solubility of fatty acids in the solvent.

The solutions of fatty acids in methyl formate solvent for use in the crystallization process herein should be at temperatures above about 50° F., and preferably from about 70° F. to about 88° F. before cooling is begun. If the original solution is prepared below 50° F., poor separation is obtained. Temperatures above about 88° F. are not feasible at atmospheric pressure because 88° F. is the boiling point of methyl formate. Furthermore, such high temperatures add to cooling requirements for conducting the crystallization.

As stated previously, the crystallization can be conducted in a stepwise manner if it is desired to produce crystal fractions which are richer respectively in stearic and palmitic acids than the blend of these two acids in the original fatty acid mixture. Stepwise crystallization is carried out by cooling the solution of fatty acids in intervals of about 8° F. to 12° F., preferably about 10° F., from the original temperature of the solution, down to 30° F. and separating the crystallized fatty acids from the solution at each step. Since stearic acid has lower solubility than palmitic acid, it crystallizes out predominantly in the earlier steps, while palmitic acid crystallizes out predominantly in the later steps.

In a preferred manner of conducting the crystallization on a commercial scale, the fatty acid solution is placed under a subatmospheric pressure, preferably a pressure of from about 160 mm. to about 220 mm. of mercury, causing a portion of the methyl formate solvent to evaporate and thus cooling the solution sufficiently to bring about crystallization with the use of little or no external refrigeration. Subatmospheric crystallization is also preferred because it provides a very uniform cooling throughout the mixture, thereby providing optimum selectivity. External cooling, as provided, for example, by a scraped-wall heat exchanger, results in a somewhat uneven cooling of the mixture, causing some crystallization to occur at temperatures lower than desired, thereby tending to reduce the selectivity of the process. The particularly economical and advantageous method of conducting the crystallization sub-atmospherically is made possible by the high volatility of methyl formate, combined with the relatively high temperature at which palmitic and stearic acids crystallize from this solvent.

The crystallized fatty acids can be removed from the dissolved fatty acids in the process of the invention by any of the conventional means of removing solids from liquids, e.g., vacuum filtration, centrifugation and the like.

The uncrystallized fatty acids can be removed from the solvent by conventional means such as simple evaporation, vacuum stripping and the like. Vacuum stripping is preferred.

A preferred manner of commercially carrying out the process herein to separate tallow fatty acid into commercial oleic and stearic acids is illustrated by the attached drawing. Tallow fatty acid from storage tank (a) and a methyl formate solvent, containing about 6.7% water, from storage tank (b) are pumped into a common stream at rates so as to form a mixture containing 20 parts tallow fatty acid, 75 parts methyl formate and 5 parts water, the temperature of the mixture being about 70° F. The stream enters the crystallizer (c) where it is exposed to a subatmospheric pressure, produced by vacuum pump m, preferably from about 160 to 220 mm. mercury, causing approximately 17% of the methyl formate to evaporate, thereby cooling the mixture to approximately 30° F. and bringing about crystallization. The evaporated solvent is condensed in condenser (d) and the liquid mixture containing the crystallized fatty acids is pumped to filter (e) where it is vacuum filtered. The filtered crystals are washed with part of the solvent from condenser (d), the remainder of the solvent from condenser (d) being pumped to storage tank (b). The filtered and washed crystals are pumped to stearic acid still (f) where they are heated so as to melt the crystals and evaporate the residual solvent. The solvent is condensed in condenser (g) and pumped to storage tank (b). The melted fatty acid which is of commercial stearic acid grade is pumped to stearic acid storage tank (h). The mother liquor from filter (e) is pumped to oleic acid still (i) where it is heated to evaporate the solvent. The solvent is condensed in condenser (j) and pumped to storage tank (b). The residual liquid fatty acid in oleic acid still (i) which is of commercial oleic acid grade, is pumped to oleic acid storage tank (k).

The invention will be further illustrated by the following examples.

EXAMPLE I 200 grams of commercial distilled tallow fatty acid were dissolved in 800 grams of methyl formate at room temperature (approx. 72° F.). The solution was cooled to 30° F., thereby causing crystals to form. The crystals were collected by vacuum filtration, washed with methyl formate, then melted and vacuum-stripped of residual methyl formate and cooled. The resulting residue is referred to hereinafter as the "saturated fatty acid residue." The methyl formate wash solution was combined with the mother liquor and the methyl formate was vacuum-stripped from the mixture. The resulting oily residue is referred to hereinafter as the "unsaturated fatty acid residue." Analysis of these residues and the original fatty acid mixture by gas chromatography of their methyl esters gave the following results, reported as percent by weight of each fatty acid in the given mixture.

TABLE 1

| Fatty acid chain length | Original fatty acid mixture | Saturated fatty acid residue | Unsaturated fatty acid residue |
| --- | --- | --- | --- |
| $C_{10}$ | | | 0.1 |
| $C_{12}$ | 0.1 | | 0.1 |
| $C_{14}$ | 2.7 | 2.5 | 2.6 |
| $C_{15}$ | | 0.5 | 1.3 |
| $C_{16}$ | 24.4 | 50.2 | 3.5 |
| $C_{16-1}$ | 4.7 | 0.5 | 6.1 |
| $C_{17}$ | | 1.4 | |
| $C_{17-1}$ | 0.4 | | 1.1 |
| $C_{18}$ | 16.8 | 38.1 | 0.1 |
| $C_{18-1}$ | 46.8 | 6.4 | 77.0 |
| $C_{18-2}$ | 2.8 | 0.1 | 6.0 |
| $C_{18-3}$ | 0.4 | | 1.4 |
| $C_{19}$ | | 0.3 | |
| $C_{20}$ | | 0.1 | |
| Unknown | 1.0 | | |

NOTE.—The number following the dash after the subscript indicating the number of carbon atoms, indicates the number of double bonds in the fatty acid.

A similarly high degree of separation of saturated from unsaturated fatty acids is obtained when the tallow fatty acid of this experiment is replaced by fatty acids from lard, mutton tallow, cocoa butter, peanut oil and from the oxidation of $C_{10}$ to $C_{20}$ olefins wherein at least one double bond in the olefin is a terminal double bond and wherein the fatty acid mxiture contains from 20% to 90% by weight oleic acid, 3% to 55% stearic acid and 3% to 55% palmitic acid.

EXAMPLE II

This example will illustrate stepwise crystallization of fatty acids to separate stearic from palmitic acids as well as separating both from oleic acid, 200 grams of the commercial distilled fatty acid of Example I are dissolved in a mixture of 750 grams of methyl formate and 50 grams of water at room temperature (approx. 70° F.). The solution is cooled to 60° F. thereby causing crystals to form. The crystals are collected by vacuum filtration and washed with methyl formate, then melted and vacuum stripped of residual methyl formate. The methyl formate wash liquor is mixed with the mother liquor and sufficient methyl formate is vacuum stripped to return the mother liquor to the original 1:4 weight ratio of fatty acid:solvent. This procedure is repeated at 50° F., and 40° F. and the final crystallization is made at 30° F. as in Example I, and all of the water and methyl formate are stripped off the mother liquor. The following table shows results obtained by gas chromatographic analysis of the methyl esters of the 60° F., 50° F., 40° F. and 30° F. crystals, as well as the methyl esters of the "unsaturated fatty acid residue" from the mother liquor after the 30° F. crystallization.

| Fatty acid chain length | 60° F. crystals | 50° F. crystals | 40° F. crystals | 30° F. crystals | Unsaturated fatty acid residue |
|---|---|---|---|---|---|
| $C_{10}$ | | | | | |
| $C_{12}$ | | | | | 0.1 |
| $C_{14}$ | 0.8 | 4.7 | 6.5 | 8.4 | 3.6 |
| $C_{15}$ | 0.3 | 0.8 | 1.1 | 1.4 | 1.7 |
| $C_{16}$ | 49.6 | 58.5 | 62.5 | 55.2 | 4.2 |
| $C_{16-1}$ | | | 1.8 | 2.8 | 7.0 |
| $C_{17}$ | 1.8 | 2.5 | 2.5 | 2.1 | |
| $C_{17-1}$ | | | | 0.4 | 1.1 |
| $C_{18}$ | 45.6 | 28.5 | 16.0 | 12.6 | 0.5 |
| $C_{18-1}$ | 1.8 | 4.0 | 9.0 | 16.4 | 72.1 |
| $C_{18-2}$ | | | | Trace | 7.3 |
| $C_{18-3}$ | | | | | 1.5 |
| $C_{19}$ | | | | | |
| $C_{20}$ | | | | | |
| Unknown, to— | 100 | 100 | 100 | 100 | 100 |

NOTE.—The number following the dash after the subscript indicating the number of carbon atoms, indicates the number of double bonds in the fatty acid.

EXAMPLE III

This example will illustrate a commercial scale separation of tallow fatty acid into commercial grade stearic acid and commercial grade oleic acid.

2000 lbs. of distilled tallow fatty acid are mixed with 8000 lbs of a solvent mixture consisting of 7,500 lbs. methyl formate and 500 lbs. water at a temperature of 70° F. The resulting 70° F. solution is pumped to a crystallization tank which is maintained at a subatmospheric pressure of 160 to about 220 mm. mercury. Evaporation of approximately 17 percent of the solvent causes the temperature of the solution to drop to about 30° F., thereby causing crystallization. The mixture containing the crystallized fatty acids is pumped to a vacuum filtration unit where the crystals are separated from the mother liquor. The crystals are washed with part of the solvent which has been evaporated in the crystallization tank and subsequently condensed. The filtered and washed crystals are pumped to a still where they are heated so as to melt the crystals and evaporate the residual solvent. Approximately 860 lbs. of commercial grade stearic acid are recovered from the still. The mother liquor from filtration unit is pumped to a still where it is heated to evaporate the solvent. Approximately 1140 lbs. of commercial grade oleic acid are recovered from the still.

What is claimed is:
1. A method of separating saturated and unsaturated fatty acids from a mixture thereof comprising the steps of:
    (A) dissolving up to about 40% by weight of a fatty acid mixture containing from about 20% to about 90% by weight oleic acid, from about 3% to about 55% by weight stearic acid and from about 3% to about 55% palmitic acid in a solvent consisting essentially of methyl formate and 5% to 20% water;
    (B) cooling the solution of Step A to about 30° F. by reducing the pressure thereof to sub-atmospheric pressure thereby crystallizing said stearic acid palmitic acids; and
    (C) separating said crystalized fatty acid from said fatty acid solution.
2. The process of claim 1 wherein the total amount of fatty acid dissolved in the solution of Step A is from about 10% to about 30% by weight of the total solution.
3. The process of claim 1 wherein the cooling of Step B is conducted in a stepwise manner, the temperature intervals between succeeding steps being from about 80° F. to about 12° F.
4. The process of claim 1 wherein the solution prepared in Step A contains from about 5% to about 10% water.
5. The process of claim 4 wherein the cooling of Step B is conducted in a stepwise manner, the temperature intervals between succeeding steps being from about 80° F. to about 12° F.
6. The process of claim 1 wherein said fatty acid mixture is a tallow fatty acid.

References Cited
UNITED STATES PATENTS
2,200,391  5/1940  Freeman _____ 260—428

FOREIGN PATENTS
439,128  11/1935  Great Britain _____ 260—420

LEWIS GOTTS, Primary Examiner

E. G. LOVE, Assistant Examiner

PO-1050
(5/69)

UNITED STATES PATENT OFFICE
CERTIFICATE OF CORRECTION

Patent No. 3,755,389                    Dated   August 28, 1973

Inventor(s)  Ted L. Blaney

It is certified that error appears in the above-identified patent and that said Letters Patent are hereby corrected as shown below:

Column 5, line 9, delete "acid, 200" and insert -- acid. 200 --.

Column 5, line 38, delete "$C_{18z1}$" and insert -- $C_{18-1}$ --.

Column 6, line 35, delete "80°F." and insert -- 8° F. --.

Column 6, line 42, delete "80°F." and insert -- 8° F. --.

Drawing Sheet, delete "January 24, 1970" and insert -- December 24, 1970 --.

Signed and sealed this 18th day of December 1973.

(SEAL)
Attest:

EDWARD M. FLETCHER, JR.           RENE D. TEGTMEYER
Attesting Officer                 Acting Commissioner of Patents